(12) United States Patent
Yoshikawa

(10) Patent No.: US 6,466,066 B1
(45) Date of Patent: Oct. 15, 2002

(54) MULTISTAGE PIPELINE LATCH CIRCUIT AND MANUFACTURING METHOD FOR THE SAME

(75) Inventor: Atsushi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/717,160

(22) Filed: Nov. 21, 2000

(30) Foreign Application Priority Data

Nov. 25, 1999 (JP) ............................................. 11-334945

(51) Int. Cl.[7] .................................................. H03L 7/00
(52) U.S. Cl. ....................................... 327/141; 327/144
(58) Field of Search ................................ 327/199, 200, 327/218, 141, 144, 145, 154; 377/64, 67, 69, 73, 78, 81

(56) References Cited

U.S. PATENT DOCUMENTS 6,260,128 B1 * 7/2001 Ohshima et al. ............. 711/169
6,265,904 B1 * 7/2001 Killorn ........................ 327/218

FOREIGN PATENT DOCUMENTS

| JP | 62-200836 | 9/1987 |
| JP | 5-166303 | 7/1993 |
| JP | 9-230958 | 9/1997 |
| JP | 10-320074 | 12/1998 |
| JP | 10-334685 | 12/1998 |

\* cited by examiner

*Primary Examiner*—Tuan T. Lam
(74) *Attorney, Agent, or Firm*—Scully, Scott, Murphy & Presser

(57) ABSTRACT

The present invention provides a multistage pipeline latch circuit that tolerates the displacement of a clock edge by exploiting the insertion positions of the latch circuits and the clock input timing to the latch circuits. A latch circuit, operating as a two or more stage pipeline, provides an input flip flop circuit to which an input signal is applied, an output flip flop circuit that supplies an output signal, and a latch circuit provided between the input and output flip flop circuits, a clock signal supply means that supplies a common clock signal to the input and output flip flop circuits and the latch circuits, and a circuit insertion position selection means that determines the insertion position of the input and output flip flop circuits and the latch circuits so that the input of the latch circuit is defined at the center of the through period of the latch circuits are provided.

13 Claims, 8 Drawing Sheets

MULTISTAGE PIPELINE LATCH CIRCUIT AND MANUFACTURING METHOD FOR THE SAME

BACKGROUND OF THE INVENTION

1. Field of the Invention

The present invention relates to a multistage pipeline latch circuit advantageously used in LSI design, and relates in particular to a latch circuit that take into account the timing of the data input and the clock input and a multistage pipeline latch circuit and manufacturing method for the same.

2. Description of the Related Art

Conventionally, in order to form a multistage pipeline latch circuit during LSI design, generally, flip-flop circuits, latch circuits, and the like are used. Here, a pipeline latch circuit denotes a circuit that transmits stored data in sequence using flip-flop circuits, latch circuits, and the like. FIG. 8 is a structural drawing of the packaged state of a two stage pipeline latch circuit formed using flip-flop circuits and latch circuits, and shows the reference clock CLK, the flip-flop FF package, the latch packages (A) to (C), and the latch insertion positions. The reference clock CLK has a clock frequency that can carry at least two clock wavelengths, one at a start point flip-flop 000 and one at an end point flip-flop 002. When the clock frequency is 100 MHz, for example, one cycle of the clock becomes 10 nsec, which cannot be ignored even when compared to the switching speed of a switching transistor, and thus the clock waveform distribution will appear in the wiring pattern that connects the flip-flop circuits and the latch circuits.

The start point flip flop 000, middle flip flop 001, and the end point flip flop 002 are rising edge flip-flops FF. The latch circuit 003 is an LL latch circuit with a through period when the clock is 0 (low) and a hold period when the clock is 1 (high). The latch circuit 004 is an LH latch circuit with a through period when the clock is 1 and a hold period when the clock is 0. Reference numerals 010 to 014 denote logic gates. The clock waveform 020 is the clock waveform CKL input to the flip flop circuits FF and the latch circuits LL and LH.

As shown by the FF package in FIG. 8, in the case of packaging a two stage pipeline using flip flop circuits, the delay of the logic gates between flip flop circuits must fulfill the following Equations. Here, the waveform of the clock is assumed to be ideal. (conditions for the insertion position of the middle flip flop 001)

$$Ftpd+D010+Fset \leq Tclk \qquad (1)$$

$$Ftpd+D011+Fset \leq Tclk \qquad (2)$$

Here, Ftpd and Fset respectively denote the delay time and the setup time of the flip flop circuit, D010 and D011 respectively denote the delay times of logic gate 010 and 011, and Tclk denotes the clock cycle. Using Equations 1 and 2, the logic gates having a maximum delay time of Tclk−Ftpd−Fset can be incorporated between flip flop circuits.

The maximum delay of the logic gates permitted during 2 clock cycles becomes:

$$D010+D011=2(Tclk-Ftpd-Fset) \qquad (3)$$

There is only one point for the insertion position of the flip flop 001 in order to incorporate logic gates having the delay in Equation 3, and when displaced from this point, the maximum delay of the logic gates (3) must be decreased to less than Equation 3. In the design of flip flop circuits, there is a wait from the input of the data into the flip flop circuit until the rise of the clock, and when this waiting time increases, the maximum delay of the logic gates (3) is reduced.

Next, as shown in FIG. 8, in the case of packaging the two stage pipeline using flip flop circuits and latch circuits, data input into the latch circuits is fixed during the through period. When carried out using this structure, the waiting for the clock that occurs at the middle flip flop circuit package does not occur at the latch circuits. The maximum delay time permitted in two clock cycles becomes:

$$D012+D013+D014=2Tclk-2Ldel-Ftpd-Fset \qquad (4)$$

Here, Ldel denotes the through delay time of the latch circuit, and D012, D013 and D014 respectively denote the delay times of the logic gates 012, 013, and 014. The insertion positions of latch circuits 003 and 004 for incorporating logic gates having the delay of Equation 4 have a permitted width, and the data input to the latch circuits can be defined during the through period.

The conditions for the insertion positions of the latch circuits become the following:

(conditions for the insertion position of latch circuit 003)

$$Ftpd+D012+Lset<Tclk \qquad (5)$$

$$Ftpd+D012 \geq 1/2 \cdot Tclk \qquad (6)$$

(conditions for the insertion position of latch circuit 004)

$$Ftpd+D012+Ldel+D013+Lset \leq 3/2 \cdot Tclk \qquad (7)$$

$$Ftpd+D012+Ldel+D013 \geq Tclk \qquad (8)$$

Equations 5 and 6 are the conditions for the insertion position of latch circuit 003, and Equations 7 and 8 are the conditions for the insertion position of latch circuit 004. Therefore, the latch circuit packages A to C in FIG. 8 represent the packaging at the limits satisfying these conditions, the insertion positions of the latch circuits have a permitted width, and the conditions are not as severe as the case of using flip flop circuits. To the extent that these conditions in Equations 5 to 8 are satisfied, the maximum delay of the logic gates can be maintained at the value in Equation 4.

However, in the design of latch circuits, depending on the insertion positions of the latch circuits, the circuits may not be able to tolerate any displacement of the clock edge, and thus if the clock edge is only slightly displaced, an operational error can occur. The displacement of the clock edge occurs due to skew caused by variations in performance of the transistors during the LSI production process and jitter during LSI operations, for example. In addition, the percentage of skew and jitter with respect to the clock cycle becomes large as the operating frequency of LSI increases, and thus forming a circuit that can tolerate displacement of the clock edge is indispensable.

SUMMARY OF THE INVENTION

An object of the present invention is to provide a multistage pipeline latch circuit and a manufacturing method for the same that tolerates displacement of the clock edge by utilizing the insertion positions for the latch circuits and timing of the clock input into the latch circuits.

The multistage pipeline latch circuit according to a first aspect of the invention for resolving the above-described problems, provides an input flip flop circuit to which an input signal is applied, an output flip flop circuit that supplies an output signal, and a latch circuit provided between the input and output flip flop circuits, wherein this latch circuit, which operates as a two or more stage pipeline, provides a clock signal supply means that supplies a common clock signal to the input and output flip flop circuits and the latch circuits, and a circuit insertion position selection means that determines the insertion position of the input and output flip flop circuits and the latch circuits such that the input of the latch circuit is defined at the center of the through period of the latch circuit.

In an apparatus constructed in this manner, the insertion position of the input and output flip flop circuit and the latch circuit is determined by the circuit insertion position selection means so that the input of the latch circuit is defined at the center of the through period of the latch circuit, and thus the operation of LSI manufacture is stabilized so that the influence received by the multistage pipeline latch circuit from the Skew due to the variation in the transistor performance, the jitter, and duty ratio that occur during operation of the LSI, etc., is minimized.

Preferably, in a second aspect of the invention, the latch circuit has an LL latch circuit and an LH latch circuit, and the circuit insertion position determination means is structured having as a condition for the LL latch that:

$$Ftpd+D110=3/4 \cdot Tclk-1/2 \cdot Lset,$$

and having as a condition for the LH latch circuit that:

$$Ftpd+D110+Ldel+D111=5/4 \cdot Tclk-1/2 \cdot Lset.$$

Here, Ftpd denotes the delay time of the input flip flop circuit; D110 denotes the delay time of the logic gates mounted between input flip flop circuit and the LL latch circuit; D111 denotes the delay time of the logic gates mounted between the LL latch circuit and the LH latch circuit; Lset denotes the set-up time of the LL latch circuit and the LH latch circuit; and Tclk denotes the clock cycle.

The multistage pipeline latch circuit according to a third aspect provides an input flip flop circuit to which a signal is applied, an output flip flop circuit that supplies an output signal, and a plurality of latch circuits provided between the input and output flip flop circuits, wherein said latch circuits, which operate as a pipeline of two or more stages, provide a clock signal supply means that supplies a first clock signal to the input and output flip flop circuits, and a latch circuit clock signal supply means that supplies a fixed clock signal to each of the latch circuits such that the input of the latch circuits is defined at the middle of the through period of the latch circuits.

In a device structured in this manner, a fixed clock signal is supplied to each of the latch circuits by the latch circuit clock signal supply means, and thus even if the positions at which the plurality of latch circuits are provided between the input and output flip flop circuits vary, they are adjusted individually by the latch circuit clock signal supply means, and the operation of LSI manufacture is stabilized so that the influence received by the multistage pipeline latch circuit from the Skew due to the variation in the transistor performance, the jitter, and duty ratio that occur during operation of the LSI, etc. is minimized.

Preferably, as in a fourth aspect of the invention, the latch circuit clock signal supply means is structured so that the clock signals that are output from the clock signal supply means are input to the delay elements, and fixed clock signals are supplied to each of the latch circuits, and thus the delay time of the delay elements can be used as a clock input adjustment means.

In addition, in a fifth aspect of the invention, there is a fist LH latch circuit, an LL latch circuit, and a second LH latch circuit, and the latch circuit clock signal supply means is structured having as a condition for the first LH latch circuit that:

$$D231=Ftpd+D210-1/4 \cdot Tclk+1/2 \cdot Lset,$$

having as a condition for the LL latch circuit that:

$$D232=Ftpd+D210+Ldel+D211-3/4 \cdot Tclk+1/2 \cdot Lset,$$

and having as a condition for the second LH latch circuit that:

$$D233=Ftpd+D210+Ldel+D211+Ldel+D212-5/4 \cdot Tclk+1/2Lset.$$

Here, Ftpd denotes the delay time of the output flip flop circuit; D210 denotes the delay time for the logic gate mounted between the input flip flop circuit and the first LH latch circuit; D211 is the delay time of the logic gate mounted between the first LH latch circuit and the LL latch circuit; D212 is the delay time of the logic gate mounted between the LL latch circuit and the second LH latch circuit; Ldel is the through delay time of the LL latch circuit and the LH latch circuit; Lset denotes the set-up time for the first and second LH latch circuit and the LL latch circuit; and Tclk denotes the clock cycle.

The multistage pipeline latch circuit according to a sixth aspect provides an input flip flop circuit to which an input signal is applied, an output flip flop circuit that supplies an output signal, and a plurality of latch circuits provided between the input and output flip flop circuits, where said latch circuits, operating as a two or more stage pipeline, provide a clock signal supply means that supplies a first clock signal to an input and output flip flop circuit and a local clock signal supply means that supplies a second clock signal to the latch circuit, and the local clock signal supply means selects the second clock signal input such that the input of the latch signal is defined at the center of the through period for a specific latch in this latch circuit.

In a device structured in this manner, the second clock signal input is adjusted focusing on a particular latch circuit, instead of a being structure that supplies the second clock signal to the latch circuit by the local clock signal supply means, and thus, while this is a simple clock input adjustment, the structure is such that adjusting of other latch circuits can always be carried out by adjusting that particular latch circuit, and the operation of LSI manufacture is stabilized so that the influence received by the multistage pipeline latch circuit from the Skew due to the variation in the transistor performance, the jitter, and duty ratio that occur during operation of the LSI, etc. is minimized.

Preferably, in the seventh aspect, the latch circuit has a first LH latch circuit, an LL latch circuit, and a second LH latch circuit, and the local clock signal supply means has as conditions for the first LH latch circuit the following two equations:

$$Skew \leq (1/4 \cdot Tclk-1/2 \cdot Lset)-|1/2 \cdot Tclk-Ldel-D221|$$

$$Skew \leq (1/4 \cdot Tclk-1/2 \cdot Lset)-|Tclk-2 \cdot Ldel-D211-D212|,$$

has as conditions for the LL latch circuit the following two equations:

$$\text{Skew} \leq (1/4 \cdot Tclk - 1/2 \cdot Lset) - |1/2 \cdot Tclk - Ldel - D211|$$

$$\text{Skew} \leq (1/4 \cdot Tclk - 1/2 \cdot Lset) - |1/2 \cdot Tclk - Ldel - D212|,$$

and has as conditions for the second LH latch circuit the following two equations:

$$\text{Skew} \leq (1/4 \cdot Tclk - 1/2 \cdot Lset) - |Tclk - 2 \cdot Ldel - D211 - D212|$$

$$\text{Skew} \leq (1/4 \cdot Tclk - 1/2 \cdot Lset) - |1/2 \cdot Tclk - Ldel - D212|,$$

and this structure can select the second clock input conforming to the condition in which the Skew is largest among these six conditions.

Here, D211 denotes the delay time of the logic gate mounted between the first LH latch circuit and the LL latch circuit; D212 is the delay time of the logic gate mounted between the LL latch circuit and the second LH latch circuit; Ldel is the through delay time of the LL latch circuit and the LH latch circuit; Lset is the set-up delay of the first and second LH latch circuits and the LL latch circuit; and Tclk denotes the clock period; and Skew denotes the displacement of the clock.

Preferably, as in the eighth aspect, in the case that the delays of the logic gates of the input and output flip flop circuits and the latch circuits are equal, a particular latch circuit may serve as a latch circuit positioned at the center of the pipeline. In the ninth aspect, the local clock signal supply means can be a structure that inputs to the delay elements the clock signal output by the clock signal supply means, supplies the second clock signal to the latch circuit, and then uses the delay time of the delay elements as a means that adjusts the second clock signal input, which contributes to a reduction in the cost.

A tenth aspect of the multistage pipeline latch circuit provides an input flip flop circuit to which an input signal is applied, an output flip flop circuit that supplies an output signal, and latch circuits provided between the input and output flip flop circuits, wherein the latch circuits, operating as a two or more stage pipeline, provide a clock signal supply means that supplies a common clock signal to the input and output flip flop circuits and the latch circuit, and a logic delay adjusting means that adjusts the delay of the logic gates of the input and output flip flop circuits and the latch circuits such that the input of the latch circuits is defined at the center of the through period of the latch circuit.

An eleventh aspect of the multistage latch circuit provides an input flip flop circuit to which an input signal is applied, an output flip flop circuit that supplies an output signal, and a plurality of latch circuits provided between the input and output flip flop circuits, wherein said latch circuits, operating as a two or more stage pipeline, provide a clock signal supply means that supplies a first clock signal to an input and output flip flop circuit, a latch circuit clock signal supply means that supplies a fixed clock signal to each latch circuit, and a clock input adjusting means that adjusts each clock signal input of each latch circuit such that the input of the latch circuit is defined at the center of the through period of each latch circuit.

A twelfth aspect of the multistage latch circuit provides an input flip flop circuit to which an input signal is applied, an output flip flop circuit that supplies an output signal, and a plurality of latch circuits provided between the input and output flip flop circuits, wherein said latch circuits, operating as a two or more stage pipeline, provide a clock signal supply means that supplies a first clock signal to the input and output flip flop circuits, a local clock signal supply means that supplies a second clock signal to the latch circuits, and a clock input adjusting means that adjusts the second clock signal input such that the input of the latch circuit is defined at the center of the through period with respect to a particular latch circuit among the latch circuits.

In a thirteenth aspect of the invention, a fabrication method for the multistage pipeline that provides an input flip flop circuit to which an input signal is applied, an output flip flop circuit that supplies an output signal, and a latch circuit provided between the input and output flip flop circuits, wherein the fabrication method for a latch circuit, which operates as a two or more stage pipeline, provides a step that selects the clock signal supply circuit that supplies a common clock signal to the input and out flip flop circuits and the latch circuit, and a process that determines the insertion position of the input and output flip flop circuits and the latch circuit such that the input of the latch circuit is defined at the center of the through period of the latch circuit.

DETAILED DESCRIPTION OF THE INVENTION

To clarify the above-described invention and its object, characteristics, and advantages, an embodiment of the present invention will be explained in detail referring to the attached figures.

Figure 1:
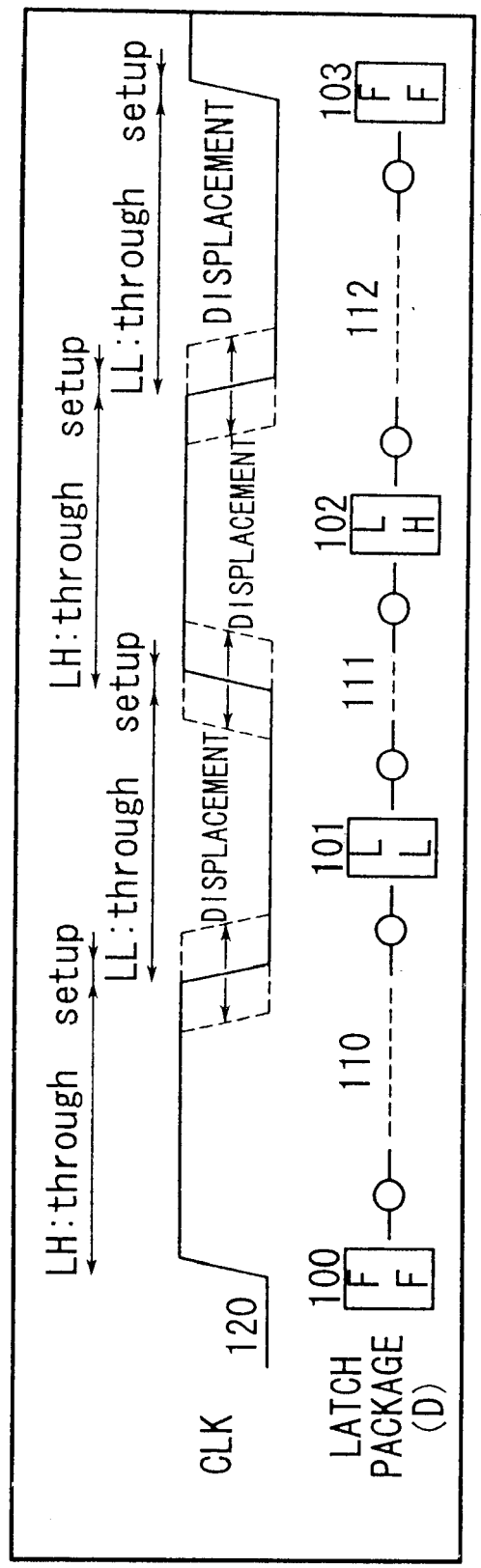
FIG. 1 is a structural drawing showing an embodiment of the two stage pipeline latch circuit formed by adjusting the delay of the logic gates.

FIG. 1 is a structural drawing showing an embodiment of a two stage pipeline latch circuit using latch circuits and flip flop circuits according to a first embodiment of the present invention. In the figure, the start point flip flop 100 and the end point flip flop 103 are rising edge flip flops. Reference numeral 101 is an LL latch circuit having a through period in the case that the clock is 0 and a hold period in the case that the clock is 1. Reference numeral 102 is an LH latch circuit having a through period when the clock is 1 and a hold period when the clock is 0. Reference numerals 110–112 denote logic gates. Reference numeral 120 is a clock waveform CLK input into the flip flop circuits and the latch circuits.

When taking into account the displacement of the clock, the conditions for the insertion positions of the latch circuits so that the data input to the latch circuit is defined during the through period are as follows:

(conditions for the input position of LL latch circuit 101)

$$Ftpd+D110+Lset+Skew \leq Tclk \qquad (9)$$

$$Ftpd+D110-Skew \geq 1/2 \cdot Tclk \qquad (10)$$

(condition is for the input position of the LH latch circuit 102)

$$Ftpd+D110+Ldel+D111+Lset+Skew \leq 3/2 \cdot Tclk \qquad (11)$$

$$Ftpd+D110+Ldel+D111-Skew \geq Tclk \qquad (12)$$

Here, Lset denotes the set-up time of the latch circuit and D110 and D111 respectively denote the delay times of the logic gates 110 and 111. Skew defines the displacement of the clock due to skew, jitter, etc.

From Equations 9 to 12, $$Lset+2Skew \leq 1/2 \cdot Tclk \qquad (13)$$

is obtained, and the maximum value of the permitted displacement of the clock is:

$$Skew=1/4 \cdot Tclk-1/2 \cdot Lset \qquad (14).$$

In order to form a circuit that tolerates the displacement of Equation 14, it is necessary that:

(condition related to LL latch circuit 101)

$$Ftpd+D110=3/4 \cdot Tclk-1/2 \cdot Lset \qquad (15)$$

(condition related to LH latch circuit 102)

$$Ftpd+D110+Ldel+D111=5/4 \cdot Tclk-1/2 \cdot Lset \qquad (16),$$

and this means that the data input to the latch circuit is defined at the center of the through period of the latch circuit. Therefore, by forming a structure in which the data input to the latch circuit is defined at the center of the through period of a latch circuit, that is, by forming a structure such that the delay of the logic gates D110 and D111 satisfies Equations 15 and 16, a circuit can be formed that has the most tolerance to displacements of the clock edge.

Figure 2:
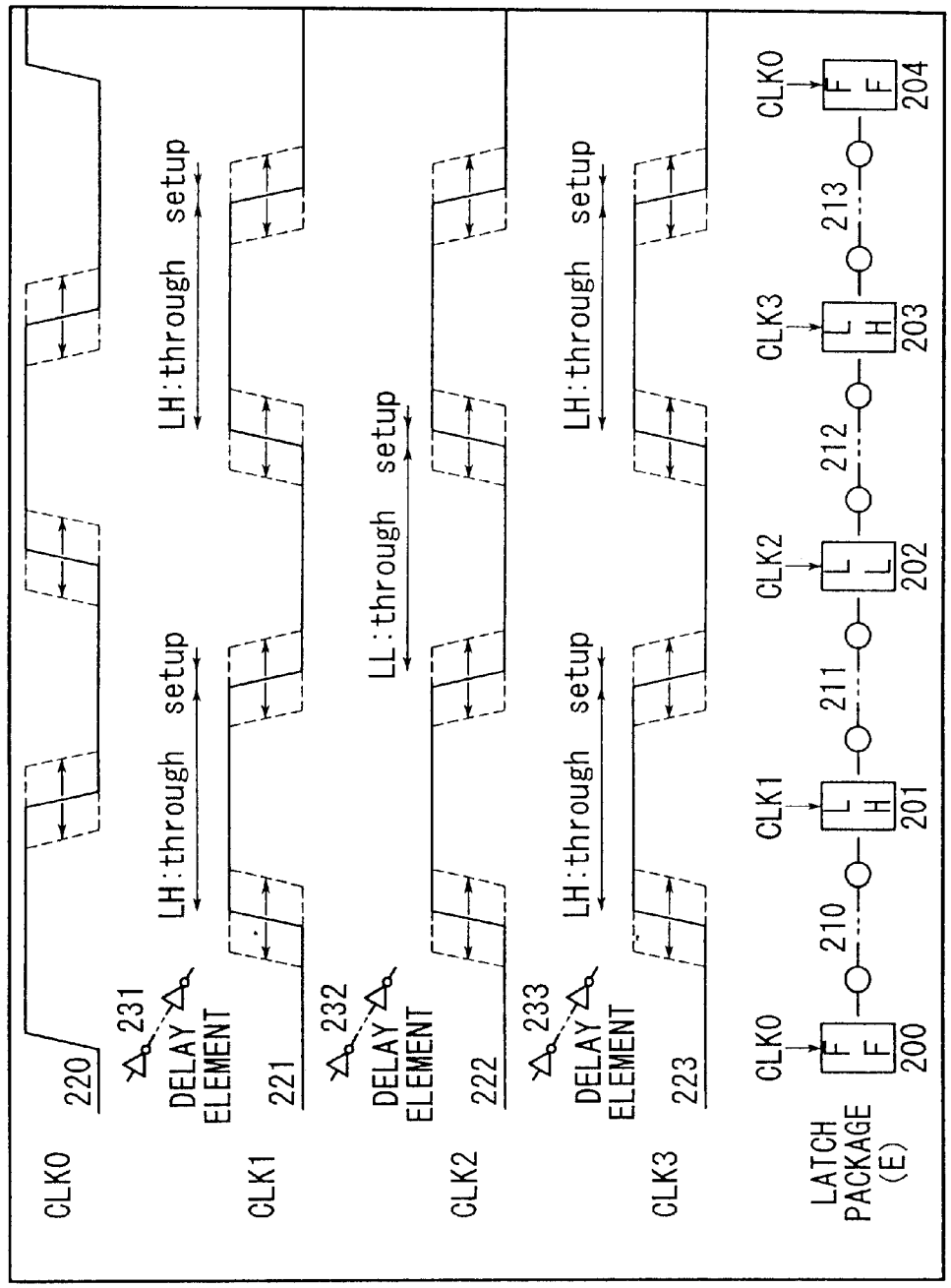
FIG. 2 is a structural drawing showing an embodiment of the two stage pipeline latch circuit formed by adjusting the delay of the logic gates.

FIG. 2 is a latch circuit according to a second embodiment of the present invention, and is a structural drawing showing the packaging of a two stage pipeline latch circuit using flip flop circuits. Rather than adjustment of the delay of the logic gates, this is a structure in which the data input to the latch circuits is defined at the center of the through period of the latch circuit by adjusting the timing of the clock input.

In the figure, the start point flip flop 200 and the end point flip flop 204 are rising edge flip flops. Reference numerals 201 and 203 denote latch LH circuits having a though period when the clock is 1 and a hold period when the clock is 0. Reference numeral 202 denotes an LL latch circuit having a through period when the clock is 0 and a hold period when the clock is 1. Reference numerals 210 to 213 denote logic gates. Reference numeral 220 is a reference clock waveform CLK. Reference numeral 221 is a clock CLK1 delayed from the reference clock 220 using delay elements 231; reference numeral 222 is a clock CLK2 delayed from the reference clock 220 using delay element 232; and reference numeral 223 is a clock CLK3 delayed from the reference clock 220 using delay element 233. The clock 220 inputs into flip flops 200 and 204, and the clocks 221 to 223 input respectively into latch circuits 201 to 203.

When taking into account the displacement of the clock, the conditions for the insertion position of the latch circuit for defining the data input to that latch circuit during the through period are as follows:

(conditions for the insertion position of the LH latch circuit 201)

$$Ftpd+D210+Lset+Skew \leq 1/2 \cdot Tclk+D231 \qquad (17)$$

$$Ftpd+D210-Skew \geq D231 \qquad (18)$$

(conditions for the insertion position of the LL latch circuit 202)

$$Ftpd+D210+Ldel+D211+Lset+Skew \leq Tclk+D232 \qquad (19)$$

$$Ftpd+D210+Ldel+D211-Skew \geq 1/2 \cdot Tclk+D232 \qquad (20)$$

(conditions for the insertion position of the LH latch circuit 203)

$$Ftpd+D210+Ldel+D211+Ldel+D212+Lset+Skew \leq 3/2 \cdot Tclk+D233 \qquad (21)$$

$$Ftpd+D210+Ldel+D211+Ldel+D212-Skew \geq Tclk+D232 \qquad (22)$$

Here, D210 to D212 respectively denote the delay times of the logic gates 210 to 212. In addition, D231 to D233 respectively denote the delay times of the delay elements 231 to 233.

From Equations 17 to 22, $$Lset+2Skew \leq 1/2 \cdot Tclk \qquad (23)$$

is obtained, and the maximum value of the permitted displacement of the clock is:

$$Skew=1/4 \cdot Tclk-1/2 \cdot Lset \qquad (24).$$

In order to form a circuit that tolerates the displacement in Equation 24, the necessary conditions are:

(condition for the LH latch circuit 201)

$$Ftpd+D210=1/4 \cdot Tclk-1/2 \cdot Lset+D231 \qquad (25)$$

(condition for the LL latch circuit 202)

$$Ftpd+D210+Ldel+D211=3/4 \cdot Tclk-1/2 \cdot Lset+D232 \qquad (26)$$

(condition for the LH latch circuit 203)

$$Ftpd+D210+Ldel+D211+Ldel+D212=5/4 \cdot Tclk-1/2 \cdot Lset+D233 \qquad (27)$$

and this means that the data input to the latch circuit is defined at the center of the through period of the latch circuit.

Rewriting Equations 25 to 27 obtains:

(condition for the LH latch circuit 201)

$$D231=Ftpd+D210-1/4 \cdot Tclk+1/2 \cdot Lset \qquad (28)$$

(condition for the LL latch circuit 202)

$$D232=Ftpd+D210+Ldel+D211-3/4 \cdot Tclk+1/2 \cdot Lset \qquad (29)$$

(condition for the LH latch circuit 203)

$$D233=Ftpd+D210+Ldel+D211+Ldel+D212-5/4\cdot Tclk+1/2\cdot Lset \quad (30)$$

By forming delay elements 231 to 233 so as to satisfy Equations 28 to 30 and adjusting the clocks 221 to 223, a circuit can be formed having the maximum tolerance to the displacement of the clock. In addition, as an added effect, by generating clocks 221, 222, and 223 from clock 220 as local clocks, the load on clock 220 can be reduced.

Figure 3:
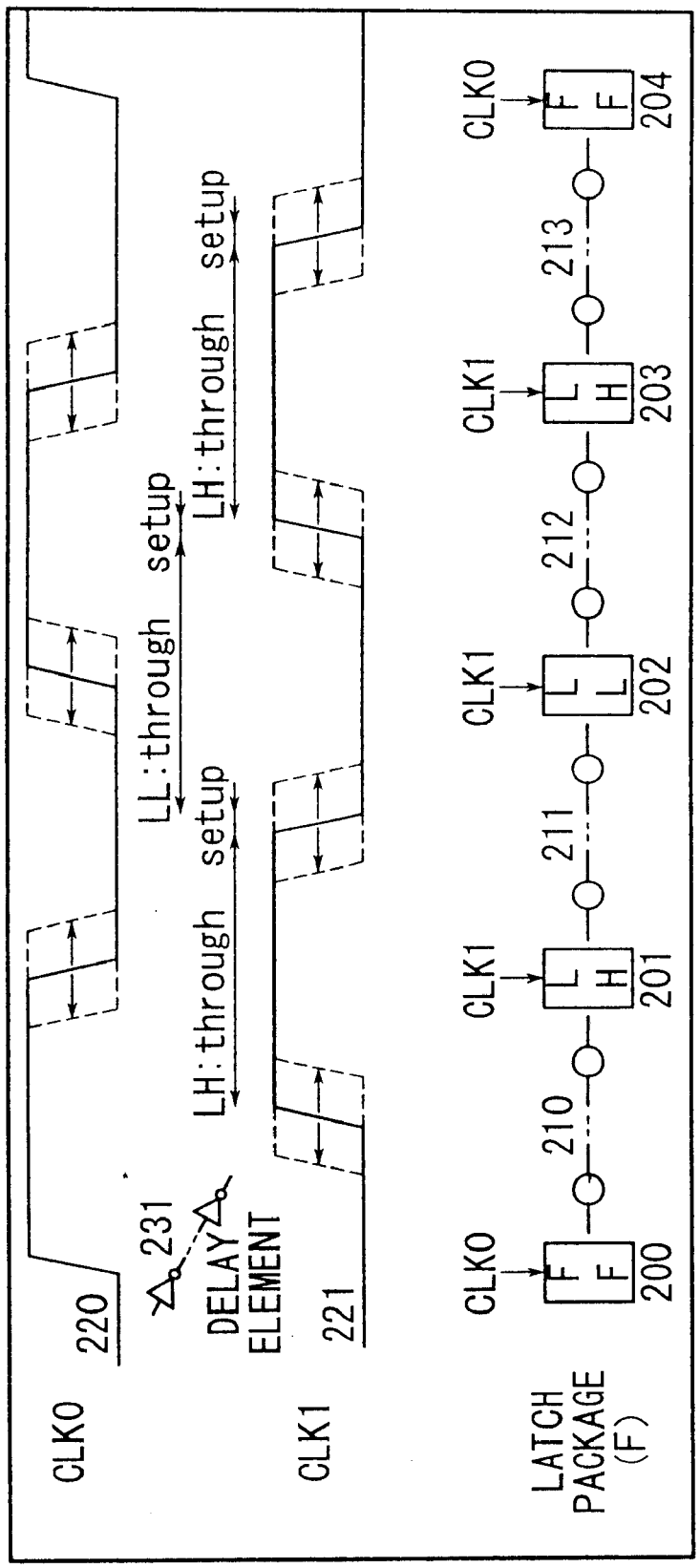
FIG. 3 is a structural drawing showing an embodiment of the two stage pipeline latch circuit formed by adjusting the clock input.

FIG. 3 shows the third embodiment, in which clock 221 is used for the clock input to each of the latch circuits, eliminating the clock 222 and clock 223 in the packaging shown in FIG. 2. From Equations 28 to 30, the following equations are obtained:

(condition for the LH latch circuit 201)

$$D231=Ftpd+D210-1/4\cdot Tclk+1/2\cdot Lset \quad (31)$$

(condition for the LL latch circuit 202)

$$D231=Ftpd+D210+Ldel+D211-3/4\cdot Tclk+1/2\cdot Lset \quad (32)$$

(condition for the LH latch circuit 203)

$$D231=Ftpd+D210+Ldel+D211+Ldel+D212-5/4\cdot Tclk+1/2\cdot Lset \quad (33)$$

Equations 31 to 33 are the conditions for forming circuits that are most tolerant to the displacement of the clock edge for the respective latch circuits 201 to 203, but delay element D231 cannot be structured so as to satisfy all the conditions.

In the case of forming the clock 221 by adjusting delay element 231 to conform to Equation 31, that is, in the case of making the structure so that the tolerance to the displacement of the clock becomes highest with respect to the latch circuit 201, from Equations 17 to 22, taking into account that D231, D232, and D233 are equal, the following conditions are obtained:

(conditions for the LH latch circuit 201)

$$Skew \leq (1/4\cdot Tclk-1/2\cdot Lset) \quad (34)$$

$$Skew \leq (1/4\cdot Tclk-1/2\cdot Lset) \quad (35)$$

(conditions for LL latch circuit 202)

$$Skew \leq (1/4\cdot Tclk-1/2\cdot Lset)+1/2\cdot Tclk-Ldel-D211 \quad (36)$$

$$Skew \leq (1/4\cdot Tclk-1/2\cdot Lset)-1/2\cdot Tclk+Ldel+D211 \quad (37)$$

(conditions for LH latch circuit 203)

$$Skew \leq (1/4\cdot Tclk-1/2\cdot Lset)+Tclk-2\cdot Ldel-D211-D212 \quad (38)$$

$$Skew \leq (1/4\cdot Tclk-1/2\cdot Lset)-Tclk+2\cdot Ldel+D211+D212 \quad (39)$$

In the case of forming the clock 221 by adjusting delay element 231 to conform to Equation 32, that is, in the case of making the structure so that the tolerance to the displacement of the clock becomes highest with respect to the latch circuit 202, from Equations 17 to 22 and 32, taking into account that D231, D232, and D233 are equal, the following conditions are obtained:

(conditions for LH latch circuit 201)

$$Skew \leq (1/4\cdot Tclk-1/2\cdot Lset)-1/2\cdot Tclk+Ldel+D21 \quad (40)$$

$$Skew \leq (1/4\cdot Tclk-1/2\cdot Lset)+1/2\cdot Tclk-Ldel-D211 \quad (41)$$

(conditions for the LL latch circuit 202)

$$Skew \leq (1/4\cdot Tclk-1/2\cdot Lset) \quad (42)$$

$$Skew \leq (1/4\cdot Tclk-1/2\cdot Lset) \quad (43)$$

(conditions for LL latch circuit 202)

$$Skew \leq (1/4\cdot Tclk-1/2\cdot Lset)+1/2\cdot Tclk-Ldel-D212 \quad (44)$$

$$Skew \leq (1/4\cdot Tclk-1/2\cdot Lset)-1/2\cdot Tclk+Ldel+D212 \quad (45)$$

0040

In the case of forming the clock 221 by adjusting delay element 231 to conform to equation 32, that is, in the case of making the structure so that the tolerance to the displacement of the clock becomes highest with respect to the latch circuit 203, from Equations 17 to 22 and 33, taking into account that D231, D232, and D233 are equal, the following conditions are obtained:

(conditions for LH latch circuit 201)

$$Skew \leq (1/4\cdot Tclk-1/2\cdot Lset)-Tclk+2\cdot Ldel+D211+D212 \quad (46)$$

$$Skew \leq (1/4\cdot Tclk-1/2\cdot Lset)+Tclk-2\cdot Ldel-D211-D212 \quad (47)$$

(condition for the LL latch circuit 202)

$$Skew \leq (1/4\cdot Tclk-1/2\cdot Lset)-1/2\cdot Tclk+Ldel+D212 \quad (48)$$

$$Skew \leq (1/4\cdot Tclk-1/2\cdot Lset)+1/2\cdot Tclk-Ldel-D212 \quad (49)$$

(conditions for the LH latch circuit 203)

$$Skew \leq (1/4\cdot Tclk-1/2\cdot Lset) \quad (50)$$

$$Skew \leq (1/4\cdot Tclk-1/2\cdot Lset) \quad (51)$$

From Equations 34 to 51 are obtained:

(structure having most Skew tolerance in LH latch circuit 201)

$$Skew \leq (1/4\cdot Tclk-1/2\cdot Lset)-|1/2\cdot Tclk-Ldel-D211| \quad (52)$$

$$Skew \leq (1/4\cdot Tclk-1/2\cdot Lset)-|Tclk-2\cdot Ldel-D211-D212| \quad (53)$$

(structure having most Skew tolerance in LL latch circuit 202)

$$Skew \leq (1/4\cdot Tclk-1/2\cdot Lset)-|1/2\cdot Tclk-Ldel-D211| \quad (54)$$

$$Skew \leq (1/4\cdot Tclk-1/2\cdot Lset)-|1/2\cdot Tclk-Ldel-D212| \quad (55)$$

(structure having most Skew tolerance in LH latch circuit 203)

$$Skew \leq (1/4\cdot Tclk-1/2\cdot Lset)-|Tclk-2\cdot Ldel-D211-D212| \quad (56)$$

$$Skew \leq (1/4\cdot Tclk-1/2\cdot Lset)-|1/2\cdot Tclk-Ldel-D212| \quad (57)$$

By forming clock 221 in conformity with the conditions 52 and 53, conditions 54 and 55, and conditions 56 and 57, even when the Skew is largest, the circuit as a whole can be formed so that the influence received from displacement of the clock is minimized.

In the case that the delays D2110 to D213 of the logic gates 210 to 213 between of flip flop circuits and the latch circuits are equal, the following Equations 52 to 57 are obtained:

(structure having most Skew tolerance in LH latch circuit 201)

$$\text{Skew} \leq (1/4 \cdot Tclk - 1/2 \cdot Lset) - |1/2 \cdot Tclk - Ldel - D211| \quad (58)$$

$$\text{Skew} \leq (1/4 \cdot Tclk - 1/2 \cdot Lset) - 2|1/2 \cdot Tclk - Ldel - D211| \quad (59)$$

(structure having most Skew tolerance in LH latch circuit 202)

$$\text{Skew} \leq (1/4 \cdot Tclk - 1/2 \cdot Lset) - |1/2 \cdot Tclk - Ldel - D211| \quad (60)$$

$$\text{Skew} \leq (1/4 \cdot Tclk - 1/2 \cdot Lset) - |1/2 \cdot Tclk - Ldel - D211| \quad (61)$$

(structure having most Skew tolerance in LH latch circuit 203)

$$\text{Skew} \leq (1/4 \cdot Tclk - 1/2 \cdot Lset) - 2|1/2 \cdot Tclk - Ldel - D211| \quad (62)$$

$$\text{Skew} \leq (1/4 \cdot Tclk - 1/2 \cdot Lset) 31 \; |1/2 \cdot Tclk - Ldel - D211| \quad (63)$$

The conditions in Equations 59 and 50 are severe, whereas Equations 60 and 61 allow the largest Skew. Thus, in the case of partitioning the delay D210 to D213 of the logic gates equally, the circuit as a whole can be formed so as to have the most tolerance to the displacement of the clock by designing the clock so as to have the most Skew tolerance to the latch circuit 202 at the center of the pipeline. The displacement of this clock has a tolerance within the range satisfied by Equation 54. Here, the delay time Ftpd of the flip flop circuits, the through delay time Ldel of the latch circuits, and the set-up time Lset of the latch circuits are sufficiently small with respect to the clock cycle Tclk, and when the delays D210 to D212 of the logic gates is about 1/2·Tclk, a circuit can be formed with the most tolerance to the clock displacement by forming the delays D231 to 233 of the logic gates to about 1/4·Tclk. In addition, as an additional effect, generating the clock 221 from the clock 220 as a local clock can reduce the load on the clock 220.

Figure 4:
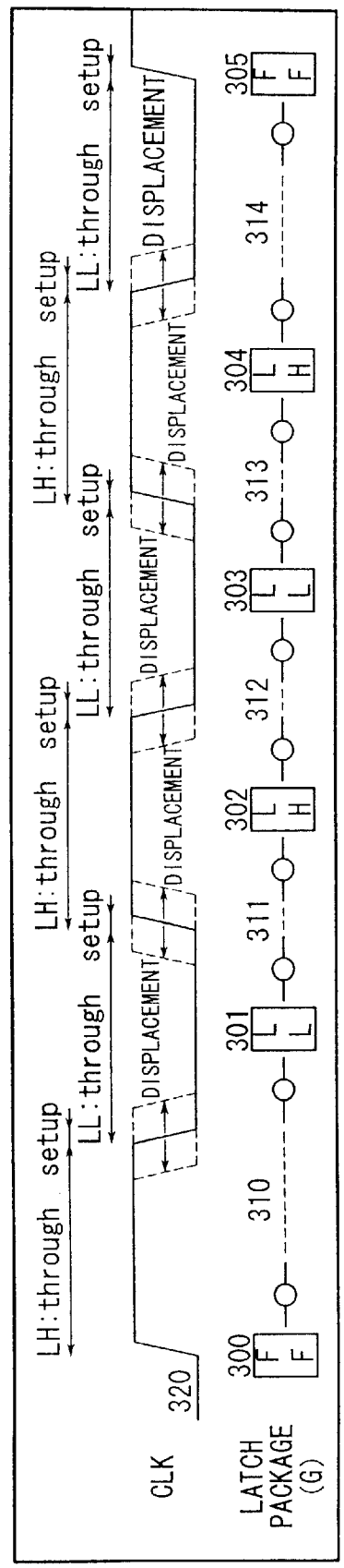
FIG. 4 is a structural drawing showing an embodiment of the three stage pipeline latch circuit formed by adjusting the delay of the logic gates.

FIG. 4 is a latch circuit according to a fourth embodiment of the present invention, and is a structural drawing showing the packaged state of a three stage pipeline latch circuit. In the figure, the start point flip flop 300 and the end point flip flop 305 are rising edge flip flops. Reference numerals 301 and 303 are LL latch circuits having a through period in the case that the clock is 0 and a hold period in the case that the clock is 1. Reference numerals 302 and 304 are LH latches having a through period in the case that the clock is 1 and a hold period in the case that the clock is 0. Reference numerals 310 through 314 denote logic gates. Reference numeral 320 is a clock waveform CLK input into the flip flop circuits and the latch circuits.

Considering the case in the same manner as that of the two stage pipeline in FIG. 1, the maximum values of the permitted displacement of the clock become:

$$\text{Skew} = 1/4 \cdot Tclk - 1/2 \cdot Lset \quad (64).$$

In order to form a circuit having the tolerance to the displacement in Equation 64, the necessary conditions are:

(condition for the LL latch circuit 301)

$$Ftpd + D310 = 3/4 \cdot Tclk - 1/2 \cdot Lset \quad (65)$$

(condition for the LH latch circuit 302)

$$Ftpd + D310 + Ldel + D311 = 5/4 \cdot Tclk - 1/2 \cdot Lset \quad (66)$$

(condition for the LL latch circuit 303)

$$Ftpd + D310 + Ldel + D311 + Ldel + D312 = 7/4 \cdot Tclk - 1/2 \cdot Lset \quad (67)$$

(condition for the LH latch circuit 304)

$$Ftpd + D310 + Ldel + D311 + Ldel + D312 + Ldel + D313 = 9/4 \cdot Tclk - 1/2 \cdot Lset \quad (68),$$

and this means that the data input to the latch circuit is defined at the center of the through period of the latch circuits.

Here, D310 to D313 denote the respective delay times of the logic gates 310 to 313. Therefore, by forming a structure in which the data input to the latch circuit is defined at the center of the through period of the latch circuit, that is, by forming a structure such that delays D310 and D313 of the logic gates satisfies Equations 65 and 68, a circuit structure having the most tolerance to displacements in the clock edge can be made.

Figure 5:
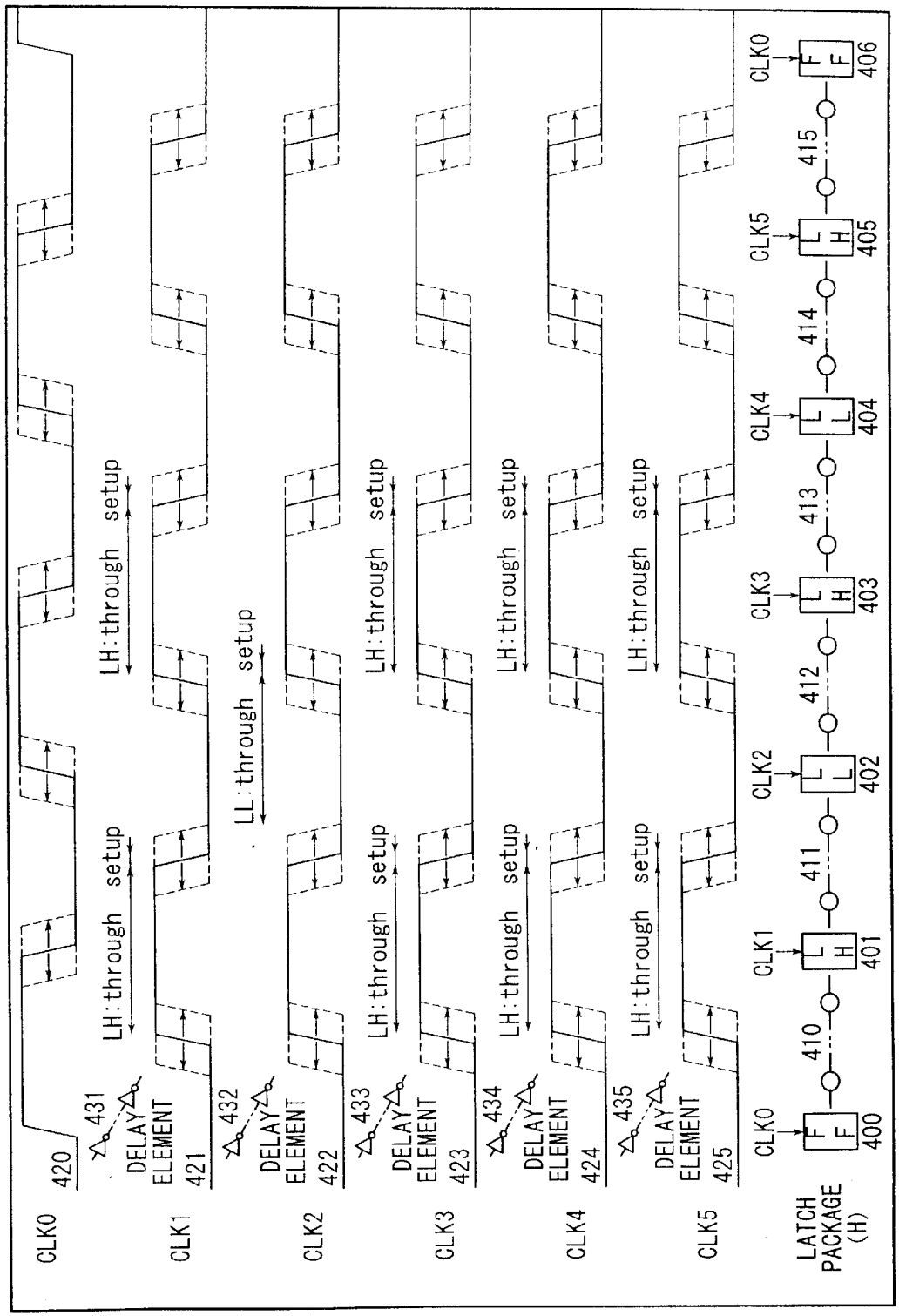
FIG. 5 is a structural drawing showing an embodiment of the three stage pipeline latch circuit formed by adjusting the clock input.

FIG. 5 is a latch circuit according to a fifth embodiment of the present invention, and is a structural drawing showing the packaged state of a three stage pipeline latch circuit using a flip flop circuit. A structure is shown in which the data input to the latch circuit is defined at the center of the through period of the latch circuit by adjusting the clock input timing, rather than adjusting the delay of the logic gates. In the figure, the start point flip flop 430 and the end point flip flop 406 are rising edge flip flops. Reference numerals 401, 403, and 405 are LH latch circuits having a though period in the case that the clock is 1 and a hold period in the case that the clock is 0. Reference numerals 402 and 404 are LL latch circuits having a though period in the case that the clock is 0 and a hold period in the case that the clock is 1. Reference numerals 410 to 415 denote logic gates. Reference numeral 420 is a reference clock waveform CLK. Reference numeral 421 is a clock CLK1 that is delayed from the reference clock 420 by using delay circuits 431; reference numeral 422 is a clock CLK2 that is delayed from the reference clock 420 by using delay circuit 432; reference numeral 423 is a clock CLK3 that is delayed from the reference clock 420 by using delay circuit 433; reference numeral 424 is a clock CLK4 that is delayed from the reference clock 420 by using delay circuit 434; and reference numeral 425 is a clock CLK5 that is delayed from the reference clock 420 by using delay circuit 435. The clock 420 is input into flip flops 400 and 406, and latch circuits 401 to 405 are respectively input into clocks 421 to 425.

Considering the case in the same manner as that of the two stage pipeline in FIG. 2, the maximum values of the permitted displacement of the clock become:

$$\text{Skew} = 1/4 \cdot Tclk - 1/2 \cdot Lset \quad (69).$$

In order to form a circuit that tolerates the displacement in Equation 69, a structure in which the data input to the latch circuit is defined at the center of the through period of the latch circuit is necessary. The conditions to attain this are as follows:

(condition for the LL latch circuit 401)

$$D431 = Ftpd + D410 - 1/4 \cdot Tclk + 1/2 \cdot Lset \quad (70)$$

(condition for the LH latch circuit 402)

$$D432 = Ftpd + D410 + Ldel + D411 - 3/4 \cdot Tclk + 1/2 \cdot Lset \quad (71)$$

(condition for the LL latch circuit 403)

$$D433 = Ftpd + D410 + Ldel + D411 + Ldel + D412 - 5/4 \cdot Tclk + 1/2 \cdot Lset \quad (72)$$

(condition for the LH latch circuit 404)

$$D434=Ftpd+D410+Ldel+D411+Ldel+D412+Ldel+D413-7/4 \cdot Tclk+1/2 \cdot Lset \quad (73)$$

(condition for LH latch circuit 405)

$$D435=Ftpd+D410+Ldel+D411+Ldel+D412+Ldel+D413+Ldel+D414-9/4 \cdot Tclk+1/2 \cdot Lset \quad (74).$$

Here, D410 to D414 respectively denote logic gates 410 to 414. In addition, D431 to D435 respectively denote the delay times of the delay elements 431 to 435. A circuit can be formed having the maximum tolerance to the displacement of the clock by forming delay elements 431 to 435 so as to satisfy Equations 70 to 74, and adjusting the clocks 421 to 425. In addition, as an additional effect, by generating clocks 421, 422, 423, 424, and 425 from clock 420 as local clocks, the load on the clock 420 can be reduced.

Figure 6:
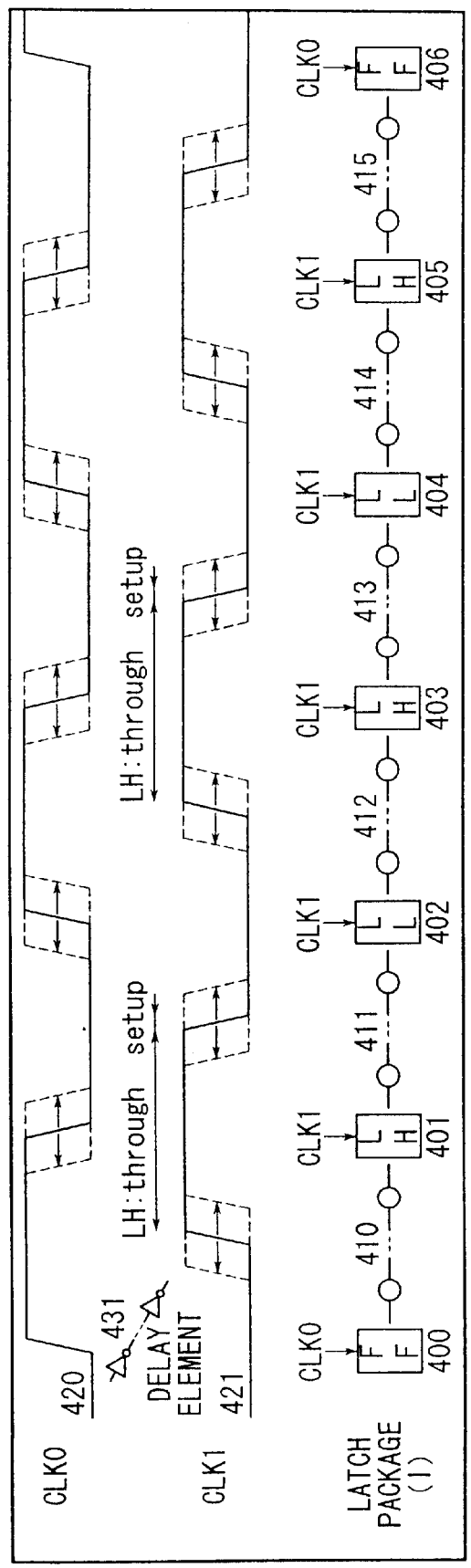
FIG. 6 is a structural drawing showing an embodiment of the three stage pipeline latch circuit formed by adjusting the clock input.

FIG. 6 is an example of packaging using the clock 421 for all the clock input to each of the latch circuits, eliminating clocks 422 to 425 in the packaging shown in FIG. 5. Considering the case in the same manner as that of the two stage pipeline in FIG. 3, the following equations are obtained:

(structure having most Skew tolerance in LH latch circuit 401)

$$Skew \leq (1/4 \cdot Tclk-1/2 \cdot Lset)-|1/2 \cdot Tclk-Ldel-D411| \quad (75)$$

$$Skew \leq (1/4 \cdot Tclk-1/2 \cdot Lset)-|Tclk-2 \cdot Ldel-D411-D412| \quad (76)$$

$$Skew \leq (1/4 \cdot Tclk-1/2 \cdot Lset)-|3/2 \cdot Tclk-3 \cdot Ldel-D411-D412-D413| \quad (77)$$

$$Skew \leq (1/4 Tclk-1/2 \cdot Lset)-|2 \cdot Tclk-4 \cdot Ldel-D41-D412-D413-D414| \quad (78)$$

(structure having most Skew tolerance in LL latch circuit 402)

$$Skew \leq (1/4 \cdot Tclk-1/2 \cdot Lset)-|1/2 \cdot Tcik-Ldel-D411| \quad (79)$$

$$Skew \leq (1/4 \cdot Tclk-1/2 \cdot Lset)-|1/2 \cdot Tclk-Ldel-D412| \quad (80)$$

$$Skew \leq (1/4 \cdot Tclk-1/2 \cdot Lset)-|Tclk-2 \; Ldel-D412-D413| \quad (81)$$

$$Skew \leq (1/4 \cdot Tclk-1/2 \cdot Lset)-|3/2 \cdot Tclk-3 \cdot Ldel-D412-D413-D414| \quad (82)$$

(structure having most Skew tolerance in LH latch circuit 403)

$$Skew \leq (1/4 \cdot Tclk-1/2 \cdot Lset)-|Tclk-2 \cdot Ldel-D411-D412| \quad (83)$$

$$Skew \leq (1/4 \cdot Tclk-1/2 \cdot Lset)-|1/2 \cdot Tclk-Ldel-D412| \quad (84)$$

$$Skew \leq (1/4 \cdot Tclk-1/2 \cdot Lset)-|1/2 \cdot Tclk-Ldel-D413| \quad (85)$$

$$Skew \leq (1/4 \cdot Tclk-1/2 \cdot Lset)-|Tclk-2 \cdot Ldel-D413-D414| \quad (86)$$

(condition having most Skew tolerance in LL latch circuit 404)

$$Skew \leq (1/4 \cdot Tclk-1/2 \cdot Lset)-|3/2 \cdot Tclk-3Ldel-D411-D412-D431| \quad (87)$$

$$Skew \leq (1/4 \cdot Tclk-1/2 \cdot Lset)-|Tclk-2Lde-D412-D413| \quad (88)$$

$$Skew \leq (1/4 \cdot Tclk-1/2 \cdot Lset)-|1/2 \cdot Tclk-Ldel-D413| \quad (89)$$

$$Skew \leq (1/4 \cdot Tclk-1/2 \cdot Lset)-|1/2 \cdot Tclk-Ldel-D414| \quad (90)$$

(structure having most Skew tolerance in LH latch circuit 405)

$$Skew \leq (1/4 \cdot Tclk-1/2 \cdot Lset)-|2 \cdot Tclk-4 \cdot Ldel-D411-D412-D413-D414| \quad (91)$$

$$Skew \leq (1/4 \cdot Tclk-1/2 \cdot Lset)-|3/2 \cdot Tclk-3 \cdot Ldel-D412-D413-D414| \quad (92)$$

$$Skew \leq (1/4 \cdot Tclk-1/2 \cdot Lset)-|Tclk-2 \cdot Ldel-D413-D414| \quad (93)$$

$$Skew \leq (1/4 \cdot Tclk-1/2 \cdot Lset)-1/2 \cdot Tclk-Ldel-D414| \quad (94)$$

A circuit can be formed that, as a whole, is least influenced by the displacement of the clock by forming the clock in line with the conditions having the largest Skew under the five sets of conditions: the conditions in Equations 75 to 78, the conditions in Equations 79 to 82, the conditions in Equations 83 to 86, the conditions in Equations 87 to 90, and the conditions in Equations 91 to 94.

In the case that the delays D410 to D415 of the logic gates 410 to 415 between the flip flops and the latch circuits are equal, the following Equations 75 to 94 are obtained:

(structure having most Skew tolerance in LH latch circuit 401)

$$Skew \leq (1/4 \cdot Tclk-1/2 \cdot Lset)-|1/2 \cdot Tclk-Ldel-D411| \quad (95)$$

$$Skew \leq (1/4 \cdot Tclk-1/2 \cdot Lset)-2|1/2 \cdot Tclk-Ldel-D411| \quad (96)$$

$$Skew \leq (1/4 \cdot Tclk-1/2 \cdot Lset)-3|1/2 \cdot Tclk-Ldel-D411| \quad (97)$$

$$Skew \leq (1/4 \cdot Tclk-1/2 \cdot Lset)-4|1/2 \cdot Tclk-Ldel-D411| \quad (98)$$

(structure having most Skew tolerance in LL latch circuit 402)

$$Skew \leq (1/4 \cdot Tclk-1/2 \cdot Lset)-|1/2 \cdot Tclk-Ldel-D411| \quad (99)$$

$$Skew \leq (1/4 \cdot Tclk-1/2 \cdot Lset)-|1/2 \cdot Tclk-Ldel-D411| \quad (100)$$

$$Skew \leq (1/4 \cdot Tclk-1/2 \cdot Lset)-2|1/2 \cdot Tclk-Ldel-D411| \quad (101)$$

$$Skew \leq (1/4 \cdot Tclk-1/2 \cdot Lset)-3|1/2 \cdot Tclk-Ldel-D411| \quad (102)$$

(structure having most Skew tolerance in LH latch circuit 403)

$$Skew \leq (1/4 \cdot Tclk-1/2 \cdot Lset)-2|1/2 \cdot Tclk-Ldel-D411| \quad (103)$$

$$Skew \leq (1/4 \cdot Tclk-1/2 \cdot Lset)-|1/2 \cdot Tclk-Ldel-D411| \quad (104)$$

$$Skew \leq (1/4 \cdot Tclk-1/2 \cdot Lset)-|1/2 \cdot Tclk-Ldel-D411| \quad (105)$$

$$Skew \leq (1/4 \cdot Tclk-1/2 \cdot Lset)-2|1/2 \cdot Tclk-Ldel-D411| \quad (106)$$

(condition having most Skew tolerance in LL latch circuit 404)

$$Skew \leq (1/4 \cdot Tclk-1/2 \cdot Lset)-3|1/2 \cdot Tck-Ldel-D411| \quad (107)$$

$$Skew \leq (1/4 \cdot Tclk-1/2 \cdot Lset)-2|1/2 \cdot Tclk-Ldel-D411| \quad (108)$$

$$Skew \leq (1/4 \cdot Tclk-1/2 \cdot Lset)-|1/2 \cdot Tclk-Ldel-D411| \quad (109)$$

$$Skew \leq (1/4 \cdot Tclk-1/2 \cdot Lset)-|1/2 \cdot Tclk-Ldel-D411| \quad (110)$$

(structure having most Skew tolerance in LH latch circuit 405)

$$Skew \leq (1/4 \cdot Tclk-1/2 \cdot Lset)-4|1/2 \cdot Tclk-Ldel-D411| \quad (111)$$

$$Skew \leq (1/4 \cdot Tclk-1/2 \cdot Lset)-3|1/2 \cdot Tclk-Ldel-D411| \quad (112)$$

$$\text{Skew} \leq (1/4 \cdot Tclk - 1/2 \cdot Lset) - 2|1/2 \cdot Tclk - Ldel - D411| \quad (113)$$

$$\text{Skew} \leq (1/4 \cdot Tclk - 1/2 \cdot Lset) - |1/2 \cdot Tclk - Ldel - D414| \quad (114)$$

Because the conditions of Equations 98 and 111 are severe, and the Skew is largest in the case of the conditions of Equations 103 to 106, in the case that the delays D410 to 415 of the logic gates are equally partitioned, by forming a clock having the most Skew tolerance to the latch circuit 403 at the center of the pipeline, as a whole, a structure can be realized having the most tolerance to the displacement of the clock. The displacement of the clock is tolerated in a range satisfying Equation 103.

Here, when the delay time Ftpd of the flip flops, the through delay time Ldel of the latch circuits, and the set-up time Lset of the latch circuits are made sufficiently small with respect to the clock cycle, and the delay times D410 to D414 are made about 1/2 Tclk, a circuit can be formed having the most tolerance to the displacement of the clock by making D431 to D435 about 1/4 Tclk. In addition, an added effect is that by generating clock 430 to clock 421 from clock 420 as local clocks, the load on clock 420 can be reduced.

Figure 7:
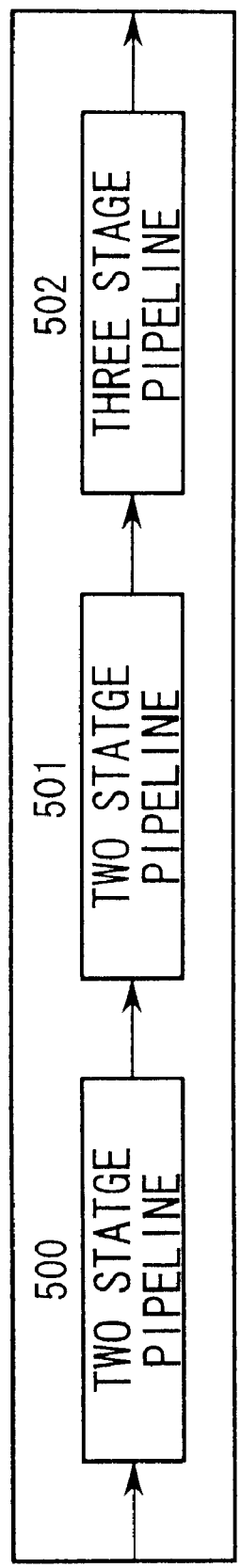
FIG. 7 is a structural drawing showing an embodiment of a seven stage pipeline latch circuit that combines two stage and three stage pipelines.
Figure 8:
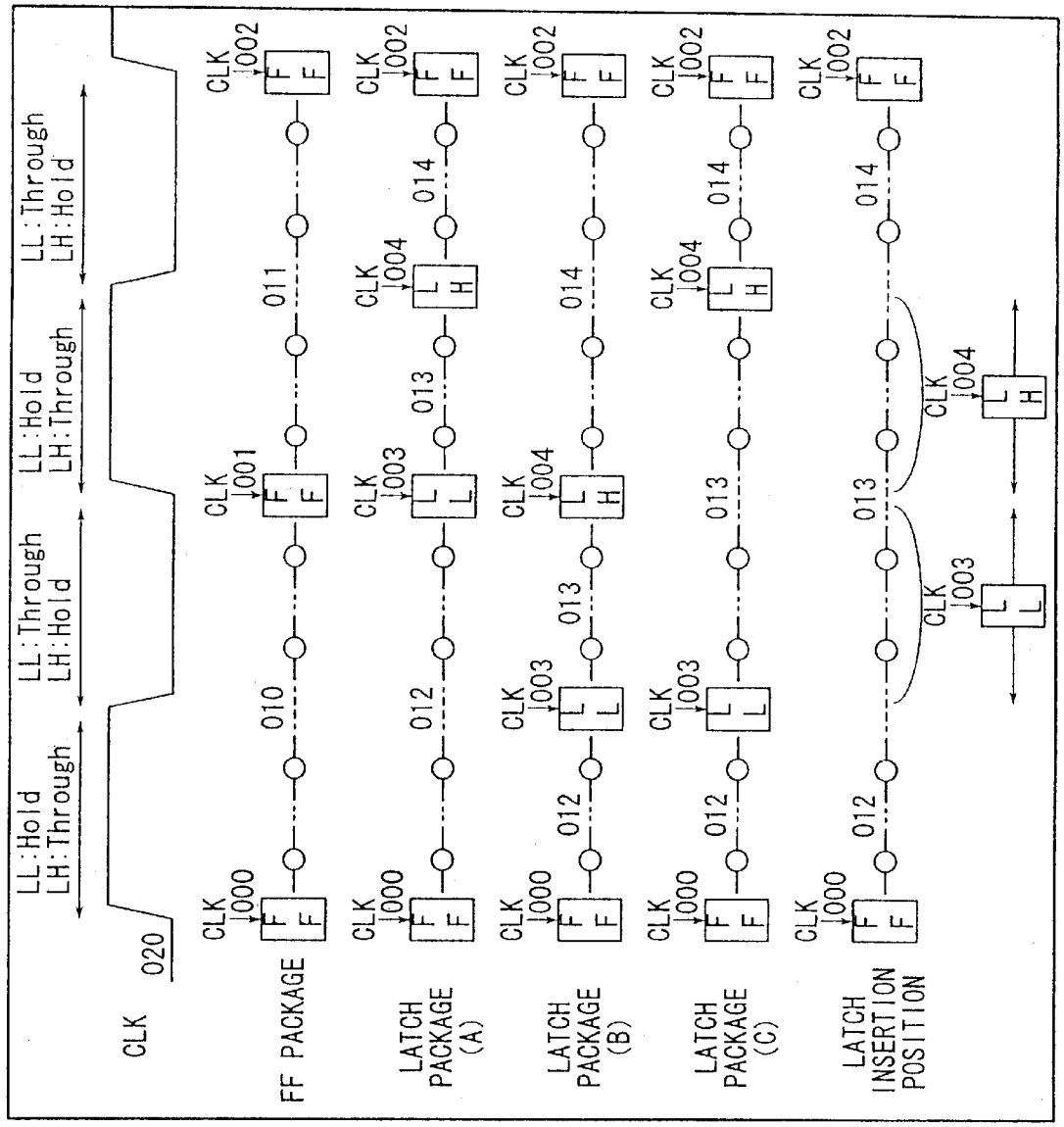
FIG. 8 is a structural drawing showing an embodiment of a two stage pipeline using flip flop circuits and latch circuits.

FIG. 1 to FIG. 3 show the packaging of a two stage pipeline structure, and FIG. 4 to FIG. 6 show the packaging of a three state pipeline structure, but by considering this packaging in a similar manner, it can be extended to an M stage pipeline (M≧4). FIG. 7 is a structural drawing showing the packaging state of a seven stage pipeline latch circuit using latch circuits and flip flop circuits as a seventh embodiment of the present invention. FIG. 1 to FIG. 3 show a two state pipeline and FIG. 4 to FIG. 6 show a three stage pipeline, and as shown in FIG. 7, these can be combined to form a seven stage pipeline. Similarly, by combining two stage, three stage, and M stage pipelines structures, an arbitrary N stage pipeline structure can be formed.

As another embodiment of the present invention, the basic structure is as described above, but the packaging of the latch circuits and flip flop circuits of this embodiment is not limited thereby. For example, using a counter clock, a falling edge flip flop can be used instead of a rising edge flip flop, and LH (high through) latch circuits can be used instead of LL (low through) latch circuits. A method of realizing the delay elements of the clock using gate delay elements such as inverters can be used.

As explained above, in a first aspect of a multistage pipeline latch circuit, by logic delay adjusting means, the insertion position of the input and output flip flop circuit and the latch circuits are determined so that the input of the latch circuit is defined at the center of the through time of the latch circuit, and thus the operation of LSI manufacture is stabilized so that the influence received by the multistage pipeline latch circuit from the Skew due to the variation in the transistor performance, the jitter, and duty ratio that occur during operation of the LSI, etc., is minimized.

In addition, in the multi-stage pipeline latch circuit according to a third aspect, a fixed clock signal is supplied to each of the latch circuits by the latch circuit clock signal supply means, and thus even if the positions at which the plurality of latch circuits are provided between the input and output flip flop circuits vary, the operation of LSI manufacture is stabilized so that the influence received by the multistage pipeline latch circuit from the Skew due to the variation in the transistor performance, the jitter, and duty ratio that occur during operation of the LSI, etc., is minimized.

Furthermore, the multistage pipeline latch circuit of the sixth aspect is a structure that generally carries out adjustment of other latch circuits using a particular latch circuit, instead of a structure that supplies a second clock signal to the latch circuit by a local clock signal supply means, and while the clock input adjustment is simple, the operation of LSI manufacture is stabilized so that the influence received by the multistage pipeline latch circuit from the Skew due to the variation in the transistor performance, the jitter, and duty ratio that occur during operation of the LSI, etc., is minimized.

In addition, the multistage pipeline latch circuit according to a tenth aspect of the present invention is a structure in which the delay of the logic gates of the input and output flip flop circuits and the latch circuits is adjusted so that the input of the latch circuits is defined at the center of the through period of the latch circuits by the logic delay adjusting means, and thus thus the operation of LSI manufacture is stabilized so that the influence received by the multistage pipeline latch circuit from the Skew due to the variation in the transistor performance, the jitter, and duty ratio that occur during operation of the LSI, etc. is minimized.

In addition, the multistage pipeline latch circuit according to a seventh aspect is a structure in which each clock signal input to each latch circuit is adjusted by a clock input adjusting means, instead of a structure supplying a fixed clock signal for each latch circuit by a latch circuit clock signal supply means, and thereby even if the positions at which the plurality of latch circuits are provided between the input and output flip flop circuits vary, each is adjusted separately by the clock input adjusting means, and thus the operation of LSI manufacture is stabilized so that the influence received by the multistage pipeline latch circuit from the Skew due to the variation in the transistor performance, the jitter, and duty ratio that occur during operation of the LSI, etc. is minimized.

Furthermore, the multistage pipeline latch circuit according to a twelfth aspect is a structure that adjusts the second click signal input for a predetermined latch circuit by a clock input adjusting means, instead of a structure that supplies a second clock signal to a latch circuit by a local clock supply means, and thus, even though the structure is simple, with a structure that generally carries out adjustment of other latch circuits by adjusting a predetermined latch circuit, the operation of LSI manufacture is stabilized so that the influence received by the multistage pipeline latch circuit from the Skew due to the variation in the transistor performance, the jitter, and duty ratio that occur during operation of the LSI, etc. is minimized.

In addition, according to the method of fabricating the multistage pipeline latch circuit according to a thirteenth aspect, the method has a step that selects a clock signal supply circuit that supplies a common clock signal to input and output flip flop circuits and latch circuits, and a step that determines the insertion position of the input and output flip flop circuits and latch circuits so that the input of the latch circuits is defined at the center of the through period of the latch circuits, and thus the operation of LSI manufacture is stabilized so that the influence received by the multistage pipeline latch circuit from the Skew due to the variation in the transistor performance, the jitter, and duty ratio that occur during operation of the LSI, etc. is minimized.

What is claimed is:

1. A multistage pipeline latch circuit that provides an input flip flop circuit to which an input signal is applied, an output flip flop circuit that supplies an output signal, and a latch circuit provided between said input and output flip flop circuits, wherein:

the latch circuit, which operates as a two or more stage pipeline, provides: a clock signal supply means that supplies a common clock signal to said input and output flip flop circuits and said latch circuit; and said latch circuits being positioned such that said input of the latch circuit is defined at the center of the through period of the latch circuit.

2. A multistage pipeline latch circuit according to claim 1 wherein:

said latch circuit has an LL latch circuit and an LH latch circuit, and a condition for said LL latch is:

$$Ftpd + D110 = 3/4 \cdot Tclk - 1/2 \cdot Lset,$$

and a condition for said LH latch circuit is:

$$Ftpd + D110 + Ldel + D111 = 5/4 \cdot Tclk - 1/2 \cdot Lset,$$

where Ftpd denotes the delay time of the input flip flop circuit; D110 denotes the delay time of the logic gate mounted between input flip flop circuit and the LL latch circuit; D111 denotes the delay time of the logic gate mounted between the LL latch circuit and the LH latch circuit; Lset denotes the set-up time of the LL latch circuit and the LH latch circuit; and Tclk denotes the clock cycle.

3. A multistage pipeline latch circuit providing an input flip flop to which a signal is applied, an output flip flop circuit that supplies an output signal and a plurality of latch circuits provided between the input and output flip flop circuits, wherein:

said plurality of latch circuits, which operate as a pipeline of two or more stages, provide:

a clock signal supply means that supplies a first clock signal to said input and output flip flop circuits; and a latch circuit clock signal supply means that supplies a common clock signal to each of said plurality of latch circuits such that the input of the latch circuit at the middle of the through period of each of said latch circuits is defined.

4. A multistage pipeline latch circuit according to claim 3 wherein the latch clock signal supply means inputs a clock signals that is output from said clock signal supply means to delay elements, whereby a circuit is formed wherein said common clock signal is supplied to each of said latch circuits.

5. A multistage pipeline latch circuit according to claim 3 wherein:

said plurality of latch circuits include a first LH latch circuit, an LL latch circuit, and a second LH latch circuit, and said latch circuit clock signal supply means has as a condition for the first LH latch circuit that:

$$D231 = Ftpd + D210 - 1/4 \cdot Tclk + 1/2 \cdot Lset;$$

said latch circuit clock signal supply means has as a condition for the LL latch circuit that:

$$D232 = Ftpd + D210 + Ldel + D211 - 3/4 Tclk + 1/2 \cdot Lset;$$

and said latch circuit clock signal supply means has as a condition for a second LH latch circuit that:

$$D233 = Ftpd + D210 + Ldel + D211 + Ldel + D212 - 5/4 Tclk + 1/2 \cdot Lset;$$

where, Ftpd denotes the delay time of the output flip flop circuit; D210 denotes the delay time for a logic gate mounted between the input flip flop circuit and the first LH latch circuit; D211 is the delay time of the logic gate mounted between the first LH latch circuit and the LL latch circuit; D212 is the delay time of a logic gate mounted between the LL latch circuit and the second LH latch circuit; Ldel is the through delay time of the LL latch circuit and the LH latch circuit; Lset denotes the set-up time for the first and second LH latch circuit and the LL latch circuit; and Tclk denotes the clock cycle.

6. A multistage pipeline latch circuit providing the input flip flop circuit to which an input signal is applied, an output flip flop circuit that supplies an output signal, and a plurality of latch circuits provided between said input and output flip flop circuits, wherein:

said plurality of latch circuits, operating as a two or more stage pipeline, provide:

a clock signal supply means that supplies a first clock signal to an input flip flop; and an output flip flop circuit and a local clock signal supply means that supplies a second clock signal to one of the plurality of latch circuits; and further wherein, said local clock signal supply means designs the second clock such that the input of a latch signal is defined at the center of the through period for a specific latch of the plurality of latch circuits.

7. A multistage pipeline latch circuit according to claim 6 wherein:

said plurality of latch circuits include a first LH latch circuit, an LL latch circuit, and a second LH latch circuit; and said local clock signal supply means has as conditions for the first LH latch circuit the following two equations:

$$Skew \leq (1/4 \cdot Tclk - 1/2 \cdot Lset) - |1/2 \cdot Tclk - Ldel - D211|;$$

and $$Skew \leq (1/4 \cdot Tclk - 1/2 \cdot Lset) - |Tclk - 2 \cdot Ldel - D211 - D212|,$$

said local clock signal supply means has as conditions for the LL latch circuit the following two equations:

$$Skew \leq (1/4 \cdot Tclk - 1/2 \cdot Lset) - |1/2 \cdot Tclk - Ldel - D211|;$$

and $$Skew \leq (1/4 \cdot Tclk - 1/2 \cdot Lset) - |1/2 \cdot Tclk - Ldel - D212|;$$

and said local clock signal supply means has as conditions for the second LH latch circuit the following two equations:

$$Skew \leq (1/4 \cdot Tclk - 1/2 \cdot Lset) - |Tclk - 2 \cdot Ldel - D211 - D212|;$$

and $$Skew \leq (1/4 \cdot Tclk - 1/2 \cdot Lset) - |1/2 \cdot Tclk - Ldel - D212|;$$

and the second clock input conforming to the condition in which the Skew is largest among these six conditions is selected, where D211 denotes the delay time of a logic gate mounted between the first LH latch circuit and the LL latch circuit; D212 is the delay time of a logic gate mounted between the LL latch circuit and the second LH latch circuit; Ldel is the through delay time of the LL latch circuit and the LH latch circuit; Lset is the set-up delay of the first and second LH latch circuits and the LL latch circuit; and Tclk denotes a clock period; and Skew denotes the displacement of the clock.

8. A multistage pipeline latch circuit according to claim 6 wherein:

a delay of a logic gate of said input and output flip flop circuits and said logic gates of said plurality of latch circuits are equal, and said specified latch circuit is a latch circuit positioned at the center of the pipeline.

9. A multistage pipeline latch circuit as in any of claims 6 through 8 wherein said local clock signal supply means inputs the clock signal output by said clock signal supply means to the delay elements, and supplies the second clock signal to the a latch circuit.

10. A multistage pipeline latch circuit providing input flip flop circuit to which an input signal is applied, an output flip flop circuit that supplies an output signal, and latch circuits provided between the input and output flip flop circuits, wherein:

said latch circuits, operating as a two or more stage pipeline, provides a clock signal supply means that supplies a common clock signal to the input and output flip flop circuits and the latch circuits; and a logic delay adjusting means that adjusts a delay of a logic gate for the input and output flip flop circuits and the latch circuits such that the input of the latch circuits is defined at the center of the through period of the latch circuit.

11. A multistage latch circuit providing an input flip flop circuit to which an input signal is applied, an output flip flop circuit that supplies an output signal, and a plurality of latch circuits provided between the input and output flip flop circuits, wherein:

said latch circuits, operating as a two or more stage pipeline, provides a clock signal supply means that supplies a first clock signal to said input and output flip flop circuit;

a latch circuit clock signal supply means that supplies a particular clock signal to each of said latch circuits; and a clock input adjusting means that adjusts each clock signal input of each of said latch circuits such that the input of said latch circuit is defined at the center of the through period of each of said latch circuits.

12. A multistage latch circuit providing an input flip flop circuit to which an input signal is applied, an output flip flop circuit that supplies an output signal, and a plurality of latch circuits provided between the input and output flip flop circuits, wherein:

said latch circuits, operating as a two or more stage pipeline, provides a clock signal supply means that supplies a first clock signal to said input and output flip flop circuits;

a local clock signal supply means that supplies a second clock signal to said latch circuits; and a clock input adjusting means that adjusts said second clock signal input such that the input of said latch circuit is defined at the center of the through period with respect to a particular latch circuit among the latch circuits.

13. A fabrication method for a multistage pipeline providing an input flip flop circuit to which an input signal is applied, an output flip flop circuit that supplies an output signal, and a latch circuit provided between the input and output flip flop circuits, a fabrication method for a latch circuit, which operates as a two or more stage pipeline, provides:

a step that selects a clock signal supply circuit that supplies a common clock signal to said input and output flip flop circuits and said latch circuit; and a step that determines the insertion position of said input and output flip flop circuits and said latch circuit such that the input of said latch circuit is defined at the center of the through period of said latch circuit.

* * * * *